June 9, 1959 A. G. MARTURANO 2,889,742

SLIDE CHANGER - RECORDER SYNCHRONIZER

Filed Sept. 26, 1957 2 Sheets-Sheet 1

ANTHONY G. MARTURANO
INVENTOR.

BY Robert Wright
HIS ATTORNEY

June 9, 1959 A. G. MARTURANO 2,889,742

SLIDE CHANGER - RECORDER SYNCHRONIZER

Filed Sept. 26, 1957 2 Sheets-Sheet 2

ANTHONY G. MARTURANO

*INVENTOR.*

*BY* Robert Wright

HIS ATTORNEY 2,889,742

SLIDE CHANGER-RECORDER SYNCHRONIZER

Anthony G. Marturano, Rome, N.Y.

Application September 26, 1957, Serial No. 686,402
3 Claims. (Cl. 88—28)

This invention relates to tape recorders and slide projectors and more particularly concerns a synchronization system whereby the sound of the tape recorder is synchronized with the picture of a slide projector or the pictures of a plurality of slide projectors.

Industrial training or educational movies or home movies cost a great deal of money, especially if only a few copies are made. In an effort to overcome this cost slide projectors which use relatively inexpensive slides and a tape recorder are being used. Automatic synchronization between picture and sound is required. Most proposals and devices for this feature are very expensive or complicated or damage the recorder.

The primary object of the present invention is to provide an inexpensive, reliable means for hearing a segment of speech or music while a particular picture is projected from a slide projector onto a viewing screen. Another object is to provide a magnetic tape for a tape recorder which is simply made and can be readily repaired and altered and which is effective to cause a change of the viewed slide in a switch operated motorized slide projector. A further object is the provision of a tape recorder attachment whereby the recorder can be easily and cheaply converted into a recorder which can be used to synchronize its sound and the picture of a slide projector. Another object is to provide an improved arrangement or combination which is adapted to automatically synchronize one or a plurality of slide pictures with a segment of music, speech or other sound. It is a further object to provide a substantially continuous visual attraction synchronized with sound.

The achievement of the above objects and others, along with the features and advantages of the present invention, will be apparent from the following description and accompanying drawings in which.

Figure 1:
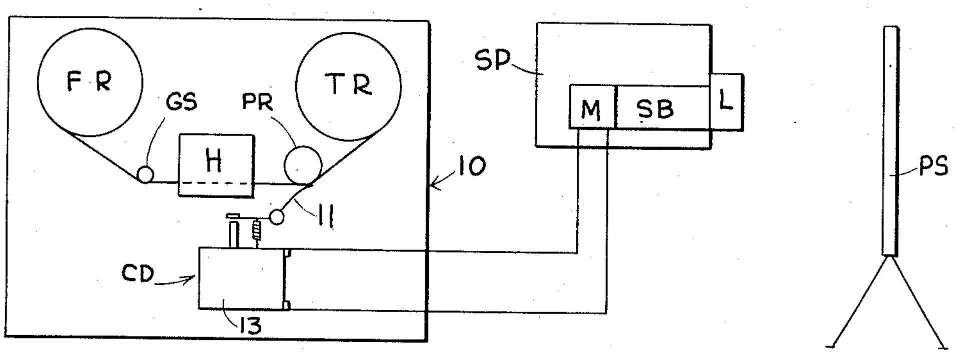
Figure 1 is a schematic representation of one embodiment of the invention and shows a tape recorder, a motorized slide projector and a picture screen arranged so that automatic sound-and-picture synchronization is obtained.

In Figure 1 the tape recorder which can be one of many conventional types is designated by reference letters TPR. The recorder TPR has a feed reel FR, a first guide post GS, a recording-playback-eraser head H, a second pressure roller PR, a take-up reel TR and a magnetic tape T which as shown is in operative arrangement for producing sound. A motorized slide projector SP which is adapted when energized to automatically remove one slide and insert another slide from slide box SB has an electric motorized device M to perform this function. Lens L magnifies the picture of the slide and projects it on the picture screen PS. Several types of commercially available slide projectors can be used by simply connecting properly the circuit of the projector motorized device M to the control device CD which is mounted on the tape recorder TPR. The control device CD is comprised of a pivoted actuating arm 11 which is spring biased against the tape T and normally open microswitch 13 which is suitably electrically connected to the motorized slide changing device M of the slide projector SP. The arm 11 when pivoted toward the switch 13 by the spring and tape slit S closes the switch which energizes the slide changer M.

Figure 2A:
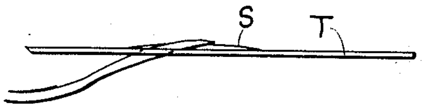
Figure 2A is a showing of the actuating arm of the control device of the present invention projecting through the slit of the magnetic tape.
Figure 2B:
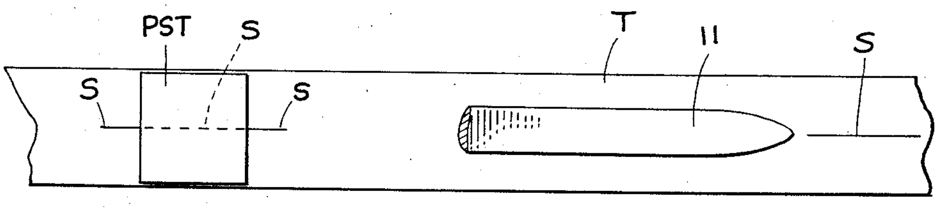
Figure 2B is a showing of the arm and the side of a tape and illustrates how simply a slit is eliminated.

As shown in Figures 1 and 2 the tape T has a plurality of slits S which are made by a sharp knife and are about one-half inch in length. Any misplaced slit can be cheaply and easily eliminated by covering with a pressure-sensitive tape PST such as Scotch tape (made by Minnesota Mining and Manufacturing Company) whereby the desired or proper sound from the tape T is related to the desired slide.

Figure 3:
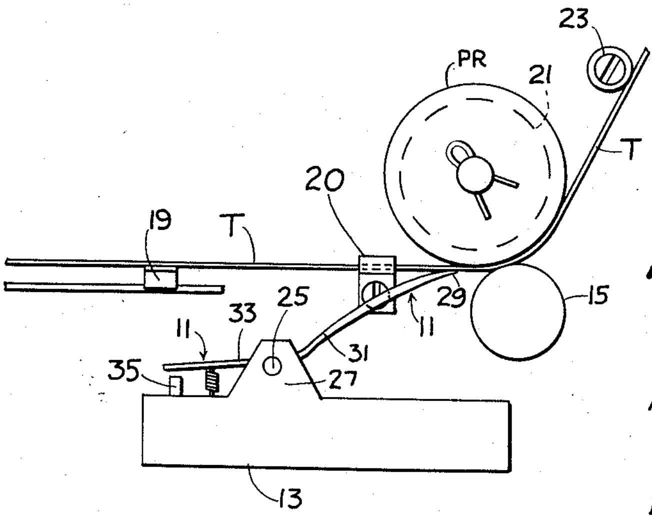
Figure 3 is a top view of the essential elements of a tape recorder and the control device.
Figure 4:
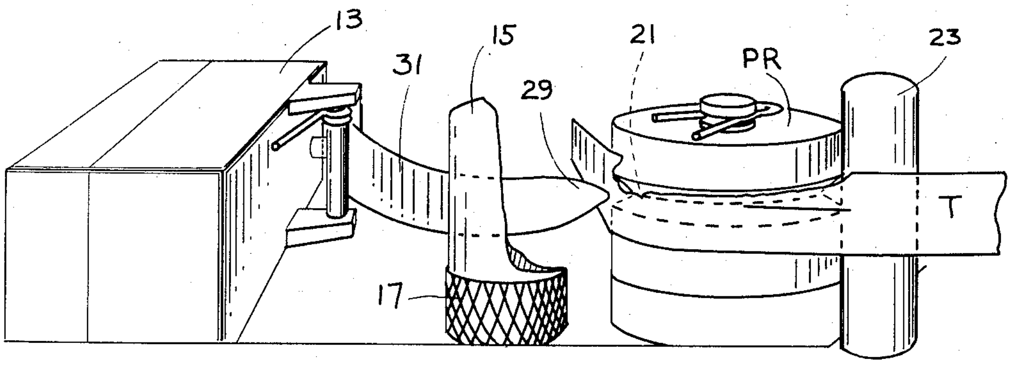
Figure 4 is a perspective view of the control device with its arm contacting the magnetic tape where it passes over a grooved spindle and where the arrangement is such that the arm can move into the slit in the tape.

In Figures 3 and 4 the actual details of the control device CD and its operative arrangement to the tape T and the elements of a particular tape recorder TPR are shown. The rotatable vertically-extending drive member 15 having a knurled raised portion 17 pulls the tape through the head, past first and second side guides 19 and 23. Knurled portion 17 is adapted to engage the lower part of pressure roller PR to rotate it and to advance the tape T by contact therewith. Tape T is backed by the upper part of pressure roller PR which carries groove 21 therein. The tape T then moves over a final guide 23 to the take-up reel TR (not shown) which is energized to tightly collect the tape. Tape T is the standard magnetic type made of a plastic or fabric and iron oxide particles which are arranged by head H to produce speech or music.

The control device CD includes arm 11 which is pivoted at 25 on a bracket 27 extending toward the tape from the microswitch 13. The lazy-L-shaped arm 11 has a dull pointed tip 29 at the end of the long part 31. Tip 29 is designed to move into the slit of the tape without tearing or damaging the tape, at the tape tensioner location just before the tape contacts the edge of the groove 21 in pressure roller PR. At this location the tip 29 can freely move through the slits. The tip is rounded or blunted at a one-eighth inch radius and has an included angle of about 45°. The tip is one-eighth inch in width and one-sixteenth inch thick. The short part 33 of the arm 11 when pivoted away from the tape as tip 29 moves into a slit contacts the extension 35 of the switch 13 whereby the switch is closed and slide changer M is actuated.

The operation of the Figures 1–4 embodiment is believed apparent from the foregoing. Slides can be viewed as sound is played and the tape marked with chalk or the like. The tape is then slit with a sharp, pointed knife or razor for about one-half inch and the audio-visual system can be run to determine if proper synchronization has been achieved. If not, the slit in the tape can be covered with Scotch tape and a new mark and slit made. Perceptible interference with the sound (music or speech) does not result from the slit or Scotch tape patch. No interference with playback at the head or erasure results. It is to be noted that the slit has no appreciable width and most of the time cannot be seen. The smooth configuration of tip 29 prevents tearing or lengthening of the slit.

The principal advantages of present invention are a large cost savings over the cost of industrial or home movies without detraction from the net result of education or enjoyment and the great simplicity of the slit feature which is easily changed and does not harm other parts of the audio device such as the head.

Figure 5:
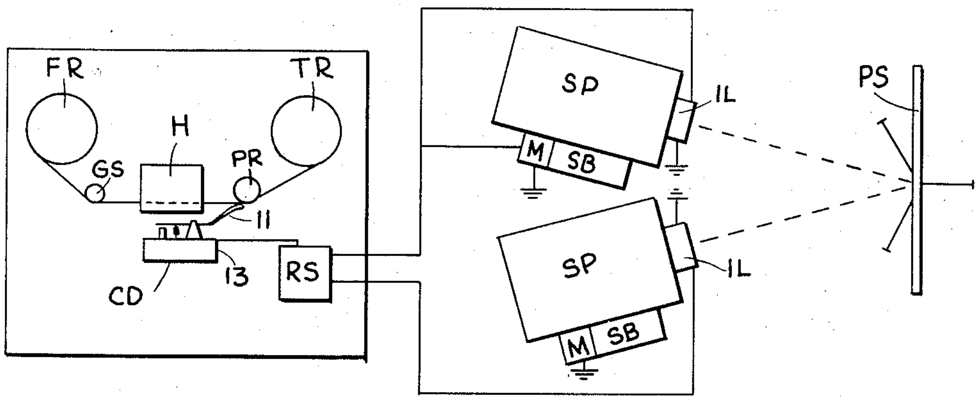
Figure 5 is a schematic showing of the control device of the present invention arranged to operate two fade-in, fade-out iris-opening slide projectors whereby sound is synchronized to substantial continuous viewing.

In Figure 5 another embodiment is illustrated diagrammatically and it provides for a fade-in, fade-out substantially continuous viewing on picture screen PS. Figure 5 parts similar to parts shown in Figure 1 are given like designations. Reference to previous description permits the omission of duplicating description or explanation. The Figure 5 embodiment has as addition a reversing switch RS whereby the slide changers M, and fade-in, fade-out iris-opening lens IL are simultaneously operated to provide a substantially continuous picture and synchronized sound automatically. The iris-opening lens can be one of several commercially available devices which can be tripped by an electric switch (not shown) such as the SVE Speed-I-O-Scope (currently made by the Society for Visional Education, Inc., Chicago, Illinois). Alternatively the slide projectors SP may be individually connected to separate microswitches mounted on tape recorder TPR. In this form the synchronization is obtained by spacing a pair of offset slits in the tape to give desired delay between changes.

The operation of the Figure 5 embodiment is believed obvious from the foregoing including the Figures 1–4 description. The difference is that there is no blank screen when the slides are being changed. Alternate slides are loaded and the tape is slitted to give the desired sound (speech or music) for the projected slide. The tape thereafter automatically actuates the slide changers.

While two embodiments of the present invention have been disclosed in detail, it is apparent that changes can be made by persons skilled in the art or equivalents substituted without departing from the invention as indicated by the following claims.

What is claimed is:

1. In an apparatus for automatically synchronizing sound from a tape recorder mechanism with pictures projected from a slide projector having a motorized slide changer, synchronizing means comprising in combination a magnetic tape transport means including a rotatable tape contacting roller, an annular groove cut in said contacting roller, said groove being cut so that it extends in the longitudinal direction of movement of the magnetic tape to be carried on said transport means and contacting said tape contacting roller, said groove being located adjacent the center line of said tape, a microswitch member connected to said slide changer and mounted adjacent said tape contacting roller, an elongated arm pivotally mounted on said microswitch member, one end of said arm being in operative association with said switch, the other end of said arm having a flat portion disposed substantially parallel and in contact with the magnetic tape as it passes over said tape contacting roller, said arm being urged into contact with said tape and said flat portion having a blunt nosed point adapted to extend into cooperating slits in the mid portion of the magnetic tape without tearing or enlarging thereof to cause said arm to be pivoted and actuate said microswitch.

2. In an apparatus for automatically synchronizing sound from a tape recorder mechanism with pictures projected from a slide projector having a motorized slide changer, synchronizing means comprising in combination a magnetic tape transport means, at least one tape guiding member, a relieved area cut in said guiding member, said relieved area being cut so as to extend in the longitudinal direction of the magnetic tape to be carried on said transport means adjacent the center line thereof, a switch member operatively associated with said slide changer and mounted adjacent said tape guiding member, an elongated arm mounted on said switch member with one end thereof being operatively connected to said switch member, the other end of said arm having a flat extended portion disposed substantially parallel and in contact with the magnetic tape as it passes over said guiding member, said flat portion having a blunt nosed point adapted to extend into cooperating slits in the mid portion of the magnetic tape without tearing or enlarging thereof to cause said arm to be pivoted and actuate said microswitch.

3. In an audio-visual apparatus for automatically synchronizing sound from a tape recorder mechanism with pictures projected from a slide-projector having a motorized slide changer, synchronizing means comprising in combination a magnetic tape transport means including at least one rotatable tape contacting roller, a plurality of annular grooves cut in said tape contacting roller said grooves being cut so that they extend in the longitudinal direction of the magnetic tape to be carried on said transport means, a plurality of microswitch members connected to said slide changer and mounted adjacent said tape contacting roller, elongated arms mounted on said microswitch members, one end of said arms being in operative association with said switches, the other end of said arms having a flat portion disposed substantially parallel and in contact with the magnetic tape as it passes over said tape contacting roller, said flat portions having a blunt nosed point adapted to extend into cooperating slits in the mid portion of the magnetic tape without tearing or enlarging thereof to cause said arms to be sequentially pivoted and actuate said microswitches whereby a plurality of picture projectors and tape recorders may be controlled in accordance with the slits positioned in the tape to be transported over said tape contacting roller.

References Cited in the file of this patent

UNITED STATES PATENTS

| | | |
|---|---|---|
| 2,138,479 | Pedatella | Nov. 29, 1938 |
| 2,528,855 | Cadwell et al. | Nov. 7, 1950 |
| 2,613,574 | Moss | Oct. 14, 1952 |
| 2,631,855 | Kornei | Mar. 17, 1953 |
| 2,693,127 | Ortman | Nov. 2, 1954 |
| 2,699,089 | Jakobs et al. | Jan. 11, 1955 |